United States Patent [19]

Fournet et al.

[11] 4,251,549

[45] Feb. 17, 1981

[54] PROCESS FOR THE PRODUCTION OF BASES FOR TARTS AND PIZZAS

[75] Inventors: Gaston Fournet, St-Lo; Alain Gueroult, Goincourt; Daniel Sauterey, Beauvais, all of France

[73] Assignee: Societe d'Assistance Technique pour Produits Nestle S.A., Lausanne, Switzerland

[21] Appl. No.: 942,471

[22] Filed: Sep. 15, 1978

[30] Foreign Application Priority Data

Sep. 29, 1977 [FR] France ................................ 77 29289
Jul. 20, 1978 [FR] France ................................ 78 21508

[51] Int. Cl.³ .............................................. A21D 6/00
[52] U.S. Cl. ...................................... 426/19; 426/138; 426/391; 99/450.1
[58] Field of Search ................. 426/19, 138, 556, 391, 426/410; 99/450.1, 450.2, 450.3, 450.6

[56] References Cited

U.S. PATENT DOCUMENTS

| | | | |
|---|---|---|---|
| 2,774,316 | 12/1956 | Daino | 426/496 |
| 3,290,154 | 12/1966 | Turner | 426/138 |
| 3,379,141 | 4/1968 | Groth | 426/502 |
| 4,065,583 | 12/1977 | Ahlgren | 426/505 |

*Primary Examiner*—Raymond N. Jones
*Assistant Examiner*—Elizabeth A. Hatcher
*Attorney, Agent, or Firm*—Watson, Leavenworth, Kelton and Taggart

[57] ABSTRACT

The invention relates to a process for the production of bases for tarts or pizzas from pastry of the dough type and a tool for carrying out the process.

According to the process the dough is kneaded, divided into lumps, the lumps thus formed are left standing for a short period, flattened, are subjected to a single rise and the bases thus formed are baked, characterized in that the flattening operation is carried out directly without preliminary rolling or rising. The tool shown in FIG. 1 comprises a stamp and a die receiving a lump on its support and means for forming a cushion of air between the stamp and the dough.

7 Claims, 4 Drawing Figures

PROCESS FOR THE PRODUCTION OF BASES FOR TARTS AND PIZZAS

This invention relates to the production of tarts or pizzas, particularly those of the kind based on pastry of the dough type.

In the production on an industrial scale of tarts or pizzas based on pastry of the dough type, one method comprises kneading the dough, dividing it into substantially equal portions or "lumps" and introducing the lumps into moulds, the dough then undergoing a first fermentation or "pre-rise". After the pre-rise, the lumps are rolled flat and then subjected to a final fermentation or "rise", the various operations involved generally lasting several hours. The pastry then undergoes the "flattening" operation. The flattening operation is the confection from a lump of a tart or pizza base intended to receive a filling. The base is then generally baked in an oven and assumes its definitive volume. After removal from the mould, the moulds being reused, the baked pastry bases are filled and either packaged to be sold in refrigerated form or are deep-frozen and then packaged.

In another conventional method, the lumps are progressively rolled after standing for 30 to 40 minutes by successive longitudinal passes, the pastry then being left standing for about 10 minutes to enable it to form a glutinous structure which causes shrinkage. "Shrinkage" is a phenomenon of progressive contraction of the band of pastry due to its elasticity until its dimensions have stabilised. Transverse rolling followed by a second rest period of a few minutes then precedes cutting. The cut sections are then placed on the bottom of moulds and mechanically flattened, the remaining operations being carried out as indicated above, the various operations involved in preparing the lumps for flattening lasting about 1 hour.

It will be appreciated from the foregoing that shrinkage is undesirable in the production of foods comprising a base intended to receive a filling. In the case of a pizza for example, the base intended to receive the filling is required to have a large diameter whilst at the same time being capable of holding the filling. Now, it is precisely doughs which are subject to the greatest shrinkage because they are extensible and tough. Their extensibility enables the pastry to be extended under the action of a force, the flattening pressure, whilst their toughness offers a resistance to the deformation forces encountered during flattening and causes shrinkage.

Shrinkage is accentuated by the use of Teflon-coated moulds. For these reasons, it has hitherto not been possible to flatten tarts or pizzas based on dough at high rates or over large diameters because it has been necessary to carry out a rolling operation before flattening or successive rolling operations to enable the elasticity of the pastry to be eliminated, followed by a rest period to enable the pastry to be flattened with the attendant disadvantages of losses of time and possession of a large area of the factory floor with a controlled atmosphere. This also explains why large-diameter flattening at high rates has been limited to chemical yeast pastries of the "lining pastry" type which, in contrast to doughs, may be qualified as plastic, in other words they remain dimensionally stable and do not break up under the effect of a flattening pressure.

The object of the present invention is to obviate the disadvantages of conventional processes for producing tarts or pizzas from pastry of the dough type.

The present invention relates to a process for the production of bases for tarts or pizzas from pastry of the dough type, in which the dough is kneaded, divided into lumps, the lumps thus formed are left standing for a short period, flattened, are subjected to a single rise and the bases thus formed are baked, characterised in that the flattening operation is carried out directly without preliminary rolling or rising.

The invention also relates to a flattening tool for carrying out the process, comprising a stamp and a die intended to form the pastry base of a tart or pizza formed by a layer of pastry raised at its edges by pressing the stamp against the die receiving a lump, characterised in that the stamp is provided with means for introducing air and for distributing a layer of air between the stamp and the pastry and with means for maintaining a raised edge of pastry at the periphery.

In the context of the invention, the term "dough" designates a paste rich in gluten containing biological yeast, i.e. baker's yeast or brewer's yeast, the pastry having the above mentioned properties of extensibility and toughness.

The generic term "tart or pizza" designates a food product composed of a pastry base containing a filling, such as a tart, quiche, pie, pizza, etc.

For carrying out the process according to the invention, the dough is kneaded for about 1 to 12 minutes by any normal or rapid kneading process to provide it with the desired rheological properties, the pastry having to be firm with a short, slightly glutinous texture. The pastry used preferably contains, for 100 parts of flours used, from 7 to 12 parts of fats and from 45 to 50 parts of water together with baker's yeast, salt, sugar and maltodextrins. After kneading, the pastry is divided into lumps and the lumps are left standing for about 10 minutes to enable the glutinous structure to form.

The lumps are then introduced into moulds, for example of Teflon-coated metal, and the moulds are delivered to a hydraulic press equipped with the flattening tool according to the invention.

Alternatively, the lumps may be placed on a flexible sheet, for example on a metal sheet of aluminium, and flattening and forming of the sheet may be carried out in a single operation by co-stamping.

The flexible sheet must have properties of mechanical strength and flexibility to enable it to withstand stamping and, if necessary, of resistance to heat in the event of subsequent baking. It is possible for example to use sheets of metal, preferably sheets of aluminium ranging from 50 to 100 $\mu$m in thickness.

After the lump has been placed on a flexible sheet, flattening and forming of the sheet are carried out simultaneously by stamping between a male and female part. Under these conditions, a tart or pizza base 230 mm in diameter and 3.5 mm thick is produced.

The flattening tool according to the invention enables flattening to be carried out at a high rate, each lump being flattened in about 3 to 5 seconds.

A flattening tool according to the invention is diagrammatically illustrated by way of example in the accompanying drawings, wherein.

Figure 1:
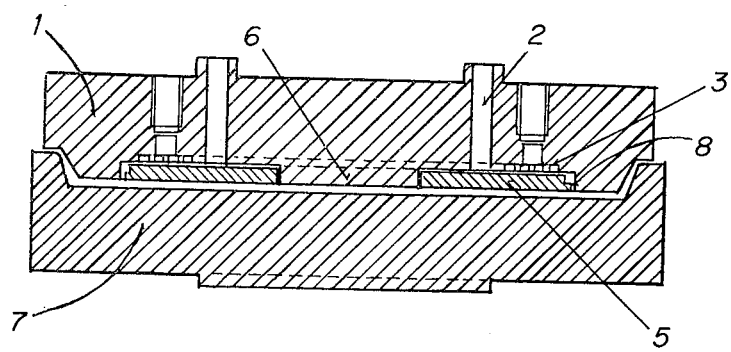
FIG. 1 is a section on the line I—I of FIG. 2 through the complete flattening tool comprising a stamp provided with a disc and a die.
Figure 2:
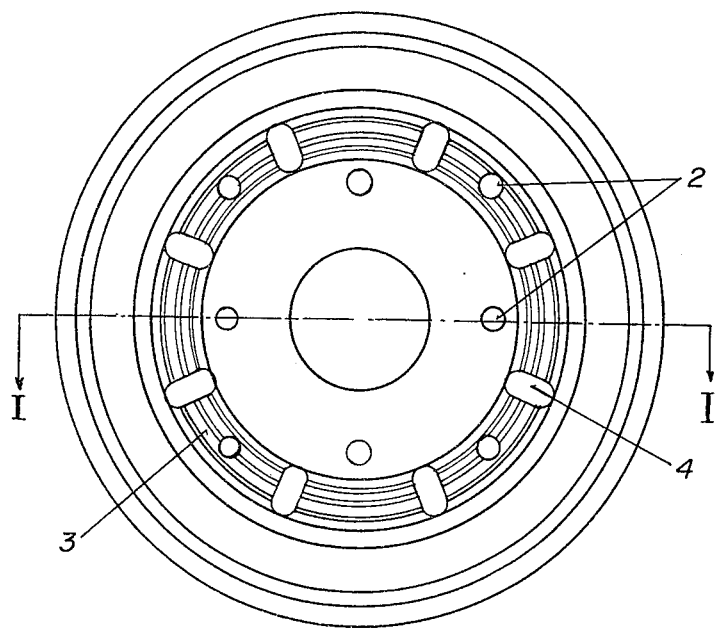
FIG. 2 is a view from below of the stamp without the disc.

In the drawing, the tool comprises a stamp 1 equipped with a mandrel by which it is fixed to the hydraulic press (not shown). The body of the stamp is provided with air inlet openings 2.

The air is distributed over the outer surface of the stamp by the concentric grooves 3 which are radially interconnected by the channels 4 for promoting a uniform distribution of the air.

The stamp 1 is provided with a disc 5 centred on a hub 6 and resting on the concentric grooves 3. During the flattening operation, the stamp 1 is applied to the pastry in the mould having the die 7 as support and the air prevents the pastry from adhering to the stamp. The throughput of air has to be regulated to ensure separation of the pastry without however causing it to be torn away during the flattening operation.

Between the body of the stamp and the disc, a reduced space 8, preferably of about 5/100 mm, enables the throughput to be limited whilst at the same time maintaining a pressure higher than that of the pastry so as to prevent the pastry from blocking this slot.

The outer surface of the stamp is provided at its periphery with a rib 9 of which the function is locally to eliminate the elasticity of the pastry and thus to reduce shrinkage. This provides for the flattening at high rates of dough bases having a large diameter, for example approximately 230 mm, which is not possible with conventional flattening heads. Although the stamp comprises only one rib in the drawing, it is obvious that it is possible to use several concentric ribs or any other raised configuration enabling the elasticity of the pastry to be eliminated, preferably at the periphery. Alternatively, one or more ribs may be provided on the moulds or on the flat part of the die in the case of co-stamping.

The flattening tool according to the invention could also be used with any low-shrinkage pastry of the lining pastry type containing chemical yeast or free from yeast, although in that case a special tool, such as the tool according to the invention, would no longer be justified because the problems caused by shrinkage would be longer arise.

Figure 3:
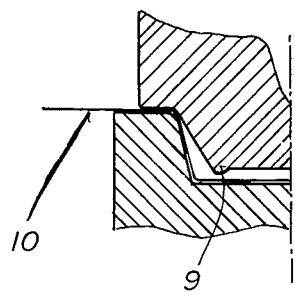
FIG. 3 is a detailed view in section of the periphery of one embodiment of the tool.
Figure 4:
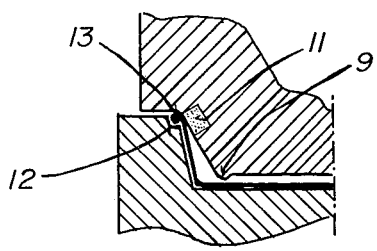
FIG. 4 is a detailed view in section of the periphery of a variant of the tool.

FIG. 3 shows an embodiment of the tool in which the pastry is flattened together with a flexible sheet 10, for example of aluminium. In FIG. 4, flattening is carried out with the lumps placed in moulds, for example of Teflon-coated metal. In this case, it is of advantage to provide a flexible seal 11, for example of rubber or a plastics material, for example polypropylene, nylon, Teflon, etc., at the level of the change in curvature of the stamp and also an opening 12 formed in the die to prevent the rims of the moulds 13 from being crushed.

After flattening, the pastry has a thickness of approximately 3 to 4 mm. It is pricked and subjected to rising for about 10 minutes, for example in a tunnel in a saturated steam atmosphere in which the temperature is progressively increased to 50° C.

The pastry is then baked for about 12 minutes at 160° to 190° C. in an oven equipped with a humidifying system under conditions enabling the pastry to develop.

The pastry then has a thickness of approximately 10 to 12 mm, which corresponds to an increase in volume of approximately 314%.

The bases are then removed from the moulds, filled with a filling which has been separately cooked and then packaged or deep frozen and packaged, whilst the moulds are returned to the head of the production line.

Alternatively, the bases may be filled before baking, although it is preferred to bake them before they are filled.

In the case of co-stamping, the same operations as those described above are carried out, but in the absence of moulds. On completion of the operation, the flexible sheets are cut to the dimensions of the finished product or to very slightly larger dimensions. A cover may then be applied by welding so that the end product assumes the form of a boat-shaped pastry.

In a preferred variant, the sheets are cut larger so as to leave sides which are then folded back onto the finished product to serve as a wrapping. After the folded edges have been welded, the product is ready for sale and is advantageously distributed as a refrigerated product. The product may also be deep frozen, in which case the folded edges do not have to be welded, but instead need only overlap to afford protection against frost.

The products in question may of course be double-wrapped.

The process according to the invention is illustrated by the following Examples, in which the parts and percentages quoted are by weight, unless otherwise indicated.

EXAMPLE 1

Dough is prepared as follows:

2.5 parts of margarine are melted in a cooking pot or melting pot.

A mixture of 26.5% of wheat flour 45 type HV and 73.5% of wheat flour 55 type RV, both products of Grands Moulins de Paris, is prepared. This mixture has the following characteristics:

| | |
|---|---|
| moisture content | 11.1% |
| water absorption | 60.6% |
| water absorption in a Bradender Farinograph | 57.7% |
| ash content | 0.51%. |

31.3 parts of the above flour mixture, 0.6 part of salt, 0.2 part of malt, 1 part of maltodextrin, 0.03 part of sugar, 0.03 part of powdered skimmed milk and 0.04 part of powdered rosemary are introduced into the container of an ARTOFEX kneader and the solids are thoroughly mixed at low speed.

The margarine is mixed with 16 parts of water and the resulting mixture introduced into the kneader.

The pastry is then kneaded at high speed for 8 minutes. 1.5 parts of biological yeast (baking quality) are then introduced, followed by kneading at high speed for 4 minutes.

The temperature of the pastry on completion of kneading is 30° to 34° C.

Alternatively, rapid kneading is carried out in a TWEEDY kneader into which the solids, the margarine and the water are introduced and kneaded at high speed for 1 minute. The baker's yeast is then added and the pastry is kneaded at high speed for 30 seconds. The temperature of the pastry on completion of kneading is 34° C.

In both cases, the pastry obtained is firm, slightly glutinous and of short texture.

The pastry is left standing for 10 minutes and divided into lumps each weighing 182 g. The lumps are then flattened in moulds of Teflon-coated metal to a diameter of the bases of 230 mm using the flattening tool according to the invention, the flattening time being 4 seconds.

After flattening, the pastry is pricked and introduced into a humidified chamber where it remains for 10 minutes, its temperature on leaving the chamber being 48° to 52° C.

The pastry is then baked in an oven equipped with a controlled humidifying system based on the injection of steam, the temperature of the oven being from 160° to 190° C. and the residence time in the oven 12 minutes.

The pastry bases are then removed from their moulds. The moulds are returned to the head of the production line.

The pastry bases weighing approximately 160 g are then provided with a filling. The pizzas are then deep-frozen in a tunnel and packaged.

EXAMPLE 2

The lumps are prepared in the same way as in Example 1 and then deposited at regular intervals of 28 cm onto a 50 μm thick sheet of aluminium, after which the lumps are successively brought below the stamping press where they are flattened on the sheet. The intermediate products obtained, namely the tart or pizza bases covered over their outer surface by a sheet of aluminium (230 mm in diameter), are introduced into a tunnel humidified with steam (residence time 10 minutes, temperature 50° C.).

The tart or pizza bases are then introduced into a baking oven (residence time 12 minutes, temperature 175° C.). The volume of the pastry increases by 314%. The sheets of aluminium are then cut between the pizzas.

Finally, each base is provided with a thin layer of filling having a thickness of 4 mm.

Part of the output intended for the circuit refrigerated to 4° C. is treated as follows: the sides of the aluminium sheet are folded down onto the filling and welded together.

Another part intended for the circuit deep frozen to −18° C. is treated somewhat differently: the sides of the aluminium sheet are folded down onto the filling, but are not welded together. The product thus wrapped is then deep frozen by progressive cooling for 30 minutes to a temperature of −30° C.

We claim:

1. A process for the production of bases for tarts or pizzas from pastry of dough rich in gluten containing biological yeast which comprises:
   (a) kneading the pastry;
   (b) dividing the pastry into lumps;
   (c) allowing the lumps to stand for a short period of time; and then without preliminary rolling or rising,
   (d) placing the pastry lumps in a hydraulic press equipped with a tool comprising a stamp, a die and a means for distributing a layer of air between the stamp and the pastry;
   (e) forming the pastry lumps into layers having their edges raised at their periphery by means of the hydraulic press while a layer of air is distributed between the stamp and the pastry;
   (f) subjecting the pastry layers to a single rise; and then
   (g) baking the pastry layers to form the bases.

2. A process as claimed in claim 1, characterised in that, for 100 parts by weight of flours used, the pastry contains from 7 to 12 parts of fats, from 45 to 50 parts of water and baker's yeast.

3. A process as claimed in claim 1, characterised in that, after kneading and before forming the pastry is left standing for about 10 minutes.

4. A process as claimed in claim 1, characterised in that the pastry is formed in 3 to 5 seconds.

5. A process as claimed in claim 1, characterised in that the bases have a diameter of approximately 230 mm.

6. A process as claimed in claim 1, characterised in that forming is carried out in a reuseable mould.

7. A process as claimed in claim 1, characterised in that forming is carried out in a single operation by costamping a flexible sheet and the pastry, the product obtained being in the form of a layer of pastry which is raised at its edges and of which the outer surface is covered by a flexible sheet.

* * * * *

UNITED STATES PATENT AND TRADEMARK OFFICE
CERTIFICATE OF CORRECTION

PATENT NO. : 4,251,549
DATED : February 17, 1981
INVENTOR(S) : Gaston Fournet, Alain Gueroult and Daniel Sautrey It is certified that error appears in the above-identified patent and that said Letters Patent are hereby corrected as shown below:

In the Title Page, the spelling of the inventor's name "Daniel Sauterey" should read --Daniel Sautrey--.

Signed and Sealed this

Twelfth Day of May 1981

[SEAL]

Attest:

RENE D. TEGTMEYER

Attesting Officer

Acting Commissioner of Patents and Trademarks